United States Patent
Chinn et al.

(10) Patent No.: US 10,363,518 B2
(45) Date of Patent: Jul. 30, 2019

(54) SYSTEMS AND METHODS TO DEBOTTLENECK AN INTEGRATED OIL AND GAS PROCESSING PLANT WITH SOUR GAS INJECTION

(71) Applicant: Chevron U.S.A. Inc., San Ramon, CA (US)

(72) Inventors: Daniel Chinn, Danville, CA (US); Nitesh Bhuwania, Richmond, CA (US); Shabbir Husain, Houston, TX (US); Ronald P. MacDonald, Mill Valley, CA (US); Tapan K. Das, Albany, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/971,698

(22) Filed: May 4, 2018

(65) Prior Publication Data
US 2019/0105600 A1    Apr. 11, 2019

Related U.S. Application Data

(60) Provisional application No. 62/569,705, filed on Oct. 9, 2017.

(51) Int. Cl.
*B01D 53/14* (2006.01)
*C10L 3/10* (2006.01)
*E21B 43/34* (2006.01)

(52) U.S. Cl.
CPC .......... *B01D 53/1468* (2013.01); *C10L 3/103* (2013.01); *E21B 43/34* (2013.01);
(Continued)

(58) Field of Classification Search
CPC .......... B01D 53/1468; B01D 2257/304; B01D 2252/204; B01D 2256/24; B01D 2311/00;
(Continued)

(56) References Cited

U.S. PATENT DOCUMENTS 5,407,467 A * 4/1995 Lokhandwala ........ B01D 53/22
95/49
6,572,678 B1 * 6/2003 Wijmans .............. B01D 53/226
95/47

(Continued)

*Primary Examiner* — Timothy C Vanoy
(74) *Attorney, Agent, or Firm* — Karen R. DiDomenicis

(57) ABSTRACT

Disclosed are systems and methods for increasing oil production in an integrated oil and gas production plant including hydrogen sulfide removal and sour-gas injection into an underground formation. Hydrogen sulfide-selective membranes are used to debottleneck known systems and methods by removing hydrogen sulfide from bottlenecked plant process steps including sour gas compression, hydrogen sulfide removal and sour gas injection. A method of retrofitting an integrated plant includes adding a hydrogen sulfide-selective membrane upstream of an amine unit to remove hydrogen sulfide from an associated gas stream and form a permeate stream enriched in hydrogen sulfide and a retentate stream depleted in hydrogen sulfide and enriched in hydrocarbon gases. Less hydrogen sulfide is sent to the amine unit and oil production is higher than in the integrated plant without the hydrogen sulfide-selective membrane.

9 Claims, 5 Drawing Sheets

(52) U.S. Cl.
CPC .... *B01D 2252/204* (2013.01); *B01D 2256/24* (2013.01); *B01D 2257/304* (2013.01); *C10L 2290/548* (2013.01)

(58) Field of Classification Search
CPC ............ B01D 2311/02; B01D 2311/04; B01D 65/00; B01D 63/00; B01D 61/00; B01D 61/58; C10L 3/103; C10L 2290/548; C10L 2290/46; C10L 2290/541; C10L 2290/54; C10L 3/102; E21B 43/34; E21B 43/40
See application file for complete search history.

(56) References Cited

U.S. PATENT DOCUMENTS

| | | |
|---|---|---|
| 8,869,890 B2 | 10/2014 | Chinn et al. |
| 2012/0168154 A1* | 7/2012 | Chinn ...................... E21B 43/34 |
| | | 166/267 |
| 2018/0363978 A1 | 12/2018 | Ballaguet et al. |
| 2019/0030482 A1* | 1/2019 | Ding ........................ C10L 3/105 |
| 2019/0105600 A1* | 4/2019 | Chinn ................ B01D 53/1468 |

* cited by examiner

SYSTEMS AND METHODS TO DEBOTTLENECK AN INTEGRATED OIL AND GAS PROCESSING PLANT WITH SOUR GAS INJECTION

FIELD

The present disclosure relates generally to the field of systems and methods for producing oil and gas from oil and gas reservoirs while removing hydrogen sulfide from produced fluids produced from the oil and gas reservoirs and for injecting a sour gas stream containing the hydrogen sulfide into an underground formation. The present disclosure further relates to the use of membranes in an oil processing train in such systems and methods.

BACKGROUND

Production of fluids from oil and gas reservoirs containing high levels of hydrogen sulfide ($H_2S$) requires the separation of the $H_2S$ from both the produced oil and the produced natural gas and the safe disposal thereof. There are at least two widely practiced methods of processing natural gas with high $H_2S$. In one known method, the entire $H_2S$-containing natural gas stream (also referred to herein as sour gas) is dehydrated, compressed, and reinjected at high pressure in an underground formation. In another known method, the gas is sweetened in an amine unit using amine scrubbing, followed by dehydration and optionally fractionation to extract propane and butane prior to being sold as sales gas (containing mostly methane, ethane and some nitrogen). The $H_2S$ and $CO_2$ removed from gas processing in the amine unit (collectively referred to as acid gas) are sent to a Sulfur Recovery Unit (SRU) where the $H_2S$ is converted to elemental sulfur via the well-known Claus reaction. Often, both the amine units and the SRU are bottlenecks limiting overall production.

To process the oil phase from the produced fluids, after separation from the natural gas phase and water in one or more three-phase separators, the oil stream is often flashed in one or more stages to remove light components (including $H_2S$). Lastly, the oil is sent to a stabilizer column which further strips more light ends and $H_2S$ from the oil to meet a final vapor-pressure specification on the product oil. All the gases from the flash steps in the oil processing along with the stabilizer overhead gases may be combined, recompressed, and mixed with the sour gas. Some integrated facilities include parallel trains for oil production integrated with sour gas processing and sour gas injection.

It would be desirable to find ways to debottleneck integrated facilities that treat produced fluids containing high levels of hydrogen sulfide that include oil production, sour gas processing and sour gas injection.

SUMMARY

In one aspect, a system for increasing oil production in an integrated oil and gas production plant including hydrogen sulfide removal and sour-gas injection is provided. The system includes: a series of a first, second and third oil-gas separators in sequence for separating an oil-gas mixture into oil and gas phases at decreasing pressures; a crude stabilizer for receiving an oil phase from the third oil-gas separator and forming a stabilized crude and an overhead gas stream; a low-pressure compressor for compressing the overhead gas stream combined with the gas phase from the third oil-gas separator to form a medium pressure stream; a first hydrogen sulfide-selective membrane to remove hydrogen sulfide from the medium pressure stream combined with the gas phase from the second oil-gas separator to form a first permeate stream enriched in hydrogen sulfide and a first retentate stream depleted in hydrogen sulfide and enriched in hydrocarbon gases; a medium-pressure amine unit for removing hydrogen sulfide from the first retentate stream to form a medium pressure stream depleted in $H_2S$ and a low-pressure acid-gas stream enriched in $H_2S$; a medium-pressure compressor for compressing the medium pressure stream depleted in $H_2S$ to form a high-pressure stream; a high-pressure amine unit for removing hydrogen sulfide from the high-pressure stream combined with the gas phase from the first oil-gas separator to form a sweet gas stream depleted in $H_2S$ and a low-pressure acid stream enriched in $H_2S$; a Claus unit for generating sulfur from the acid-gas streams enriched in $H_2S$ that are generated from the medium-pressure and high-pressure amine plants; a permeate compressor for compressing the first permeate stream to form a compressed first permeate stream; and piping for delivering the compressed first permeate stream to a plant comprising a sour gas injection unit for injecting the compressed first permeate stream into a subterranean formation.

In another aspect, a system for increasing oil production in an integrated oil and gas production plant including hydrogen sulfide removal and sour-gas injection is provided. The system includes: a series of a first, second and third oil-gas separators in sequence for separating an oil-gas mixture into oil and gas phases at decreasing pressures; a crude stabilizer for receiving an oil phase from the third oil-gas separator and forming a stabilized crude and an overhead gas stream; a low-pressure compressor for compressing the overhead gas stream combined with the gas phase from the third oil-gas separator to form a medium pressure stream; a first hydrogen sulfide-selective membrane to remove hydrogen sulfide from the medium-pressure stream combined with the gas phase from the second oil-gas separator to form a first permeate stream enriched in hydrogen sulfide and a first retentate stream depleted in hydrogen sulfide and enriched in hydrocarbon gases; a medium-pressure amine unit for removing hydrogen sulfide from the first retentate stream to form a medium-pressure stream depleted in $H_2S$ and a low-pressure acid-gas stream enriched in $H_2S$; a medium-pressure compressor for compressing the medium-pressure stream depleted in $H_2S$ to form a high-pressure stream; a second hydrogen sulfide-selective membrane to remove hydrogen sulfide from the high-pressure stream combined with the gas phase from the first oil-gas separator to form a second permeate stream enriched in hydrogen sulfide and a second retentate stream depleted in hydrogen sulfide and enriched in hydrocarbon gases; a high-pressure amine unit for removing hydrogen sulfide from the second retentate stream to form a sweet gas stream and an acid-gas stream; a Claus unit for generating sulfur from the low-pressure, acid-gas stream enriched in $H_2S$ generated from the medium- and high-pressure amine units; a permeate compressor for compressing the first permeate stream and the second permeate stream to form a compressed injection stream; and piping for delivering the compressed injection stream to a plant comprising a sour gas injection unit for injecting the compressed injection stream into a subterranean formation.

In another aspect, a method for increasing oil production in an integrated oil and gas production plant including hydrogen sulfide removal and sour-gas injection is provided. The method includes: receiving an oil phase from the third oil-gas separator and forming a stabilized crude and an overhead gas stream in a crude stabilizer; compressing the overhead gas stream combined with the gas phase from the third oil-gas separator to form a medium-pressure stream in a low-pressure compressor; removing hydrogen sulfide from the medium-pressure stream combined with the gas phase from the second oil-gas separator in a first hydrogen sulfide-selective membrane to form a first permeate stream enriched in hydrogen sulfide and a first retentate stream depleted in hydrogen sulfide and enriched in hydrocarbon gases; removing hydrogen sulfide from the first retentate stream in a medium-pressure amine unit to form a medium-pressure stream depleted in $H_2S$ and a low-pressure acid-gas stream enriched in $H_2S$; compressing the medium-pressure stream depleted in $H_2S$ in a medium-pressure compressor to form a high-pressure stream; removing hydrogen sulfide from the high-pressure stream combined with the gas phase from the first oil-gas separator in a second hydrogen sulfide-selective membrane to form a second permeate stream enriched in hydrogen sulfide and a second retentate stream depleted in hydrogen sulfide and enriched in hydrocarbon gases; removing hydrogen sulfide from the from the second retentate stream in a high-pressure amine unit to form a sweet gas stream and an acid-gas stream; processing the acid-gas streams enriched in $H_2S$ from the medium-pressure and high-pressure amine units in a Claus unit and producing elemental sulfur; compressing the first permeate stream and the second permeate stream to form a compressed injection stream; and injecting the compressed injection stream into a subterranean formation.

In another aspect, a method of retrofitting an integrated oil and gas production plant comprising a gas processing plant for processing a first associated gas stream containing 1-50% hydrogen sulfide by volume, a sour gas injection plant for injecting a first sour gas stream into a subterranean formation and a hybrid plant for processing a second associated gas stream containing 1-50% hydrogen sulfide by volume and injecting a second sour gas stream into the subterranean formation is provided. The method includes: adding a first hydrogen sulfide-selective membrane upstream of a first amine unit to remove hydrogen sulfide from the first associated gas stream and form a first permeate stream enriched in hydrogen sulfide and a first retentate stream depleted in hydrogen sulfide and enriched in hydrocarbon gases; such that less hydrogen sulfide is sent to the first amine unit than in the integrated oil and gas production plant without the hydrogen sulfide-selective membrane and the integrated oil and gas production plant has an increased oil production rate as compared with the integrated oil and gas production plant without the hydrogen sulfide-selective membrane.

BRIEF DESCRIPTION OF THE DRAWINGS

These and other objects, features and advantages of the present invention will become better understood referring to the following description and accompanying drawings. The drawings are not considered limiting of the scope of the disclosure. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
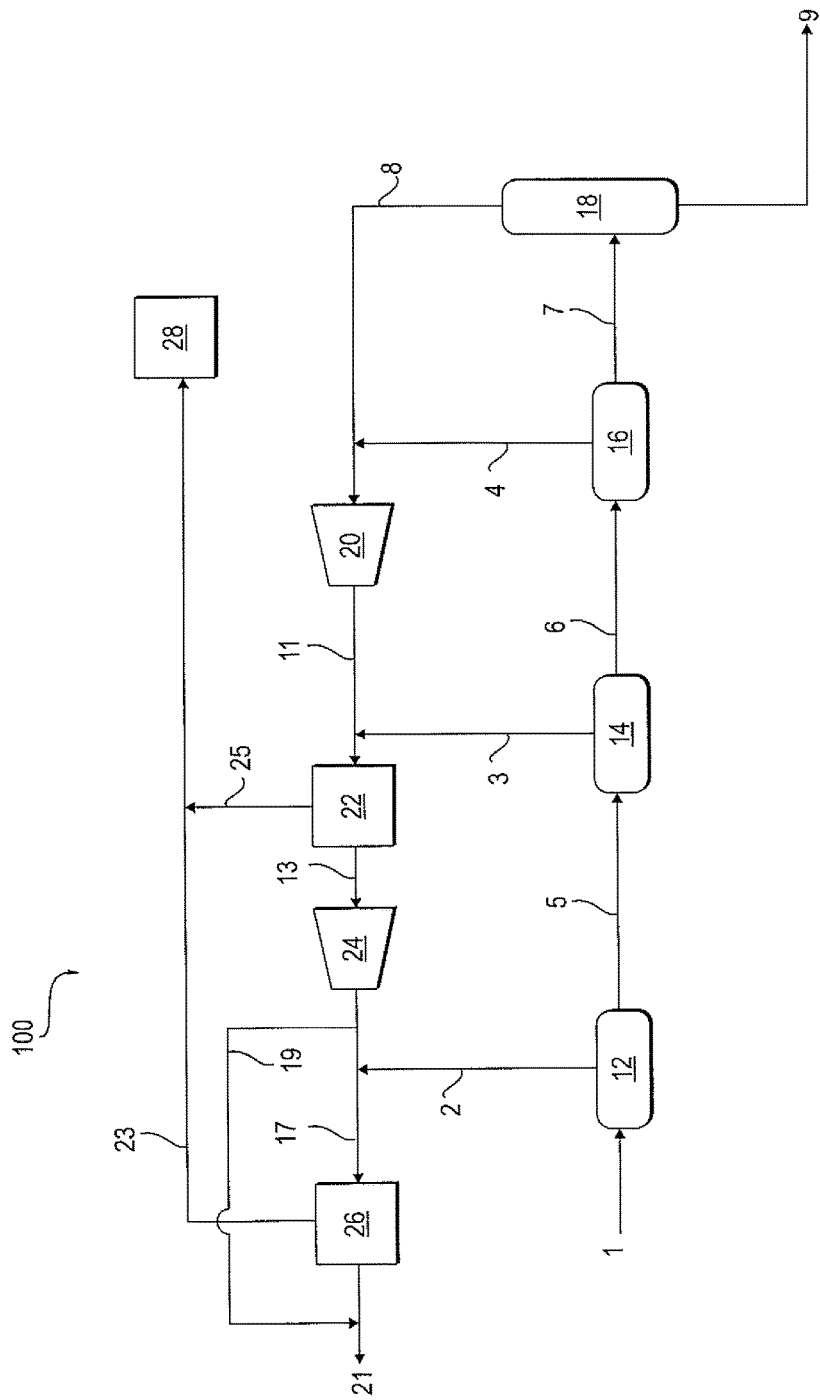
FIG. 1 shows a schematic diagram of a plant for gas processing in accordance with the prior art.

FIG. 1 is a schematic diagram of a gas processing plant 100 currently practiced in the art that processes sour gas from produced fluids from oil and gas reservoirs (not shown). As shown in FIG. 1, a gas-oil mixture or feed 1 is delivered to an inlet to the plant 100. The associated gas contained in the feed 1 typically has a composition, by way of example and not limitation, including carbon dioxide, hydrogen sulfide, nitrogen, methane, ethane, propane, normal and iso-butane, normal and iso-pentane, normal and iso-hexane, etc.

In the "oil processing train," the feed 1 is flashed in a series of flashing separators 12, 14 and 16, each designed to flash gas from oil at progressively lower pressures. Gas streams 2, 3, and 4 are flashed, respectively and separated from crude streams 5, 6 and 7. A crude stream 7 from LP separator 16 is finally sent to crude stabilizer 18, forming a final stabilized crude 9. Stabilized crude refers to a hydrocarbon product that is generally ready for transport to a refinery for further processing into desired products such as naphtha, gasoline, diesel, etc, and generally refers to oil that is reduced in vapor pressure, thereby making the crude oil safe for transport. Such oil may be stored in a vented tank at atmospheric pressure or transported through a pipeline. Actual specifications for stabilized oil may vary but often the stabilized oil has a Reid Vapor Pressure (RVP) of 10-12 psia. $H_2S$ specification may vary. However, by way of example and not limitation, $H_2S$ content may be on the order of 10-60 parts per million.

The high-pressure (HP) gas 2 from the high-pressure separator 12 is processed in a high-pressure amine unit 26. Acid gases, such as $H_2S$ and $CO_2$, are stripped from the gas streams in the amine unit, thus producing enriched acid gas streams and enriched hydrocarbon streams. As a non-limiting example, the acid gas stream may include a small amount of hydrocarbons, typically methane ($C_1$), water vapor, carbon dioxide ($CO_2$), and hydrogen sulfide ($H_2S$). The medium-pressure (MP) gas 3 from the medium pressure separator 14 is processed in a separate medium-pressure (MP) amine unit 22. Product gas 13 is recompressed in medium-pressure compressor 24, and is blended as gas stream 19 with the product gas 21 from the HP amine unit 26 if the $H_2S$ specification is met. Sweet or product gas 21 can be sent for further processing. In cases where the $H_2S$ specification is not met, the gas 17 may be sent to the inlet of the HP amine unit 26. The low-pressure (LP) flash gas 4 from the low-pressure separator 16 is blended with the overhead gas 8 from the crude stabilizer 18, and is recompressed in low-pressure compressor 20 and mixed with the MP gas 3. All the $H_2S$ recovered from both the MP and HP amine units 22 and 26 respectively is sent to a Claus unit or SRU 28, which is well known to those skilled in the art of treating acid gases that include relative high concentrations of $H_2S$. The Claus unit 28 may convert at least a portion of the $H_2S$ into elemental sulfur, which may be subsequently transported and sold for commercial uses like fertilizer and production of sulfuric acid. As is known in the art, often amine unit 22, amine unit 26 and/or the SRU 28 is a bottleneck because of limited capacity to process high levels of hydrogen sulfide in each of these units.

Figure 2:
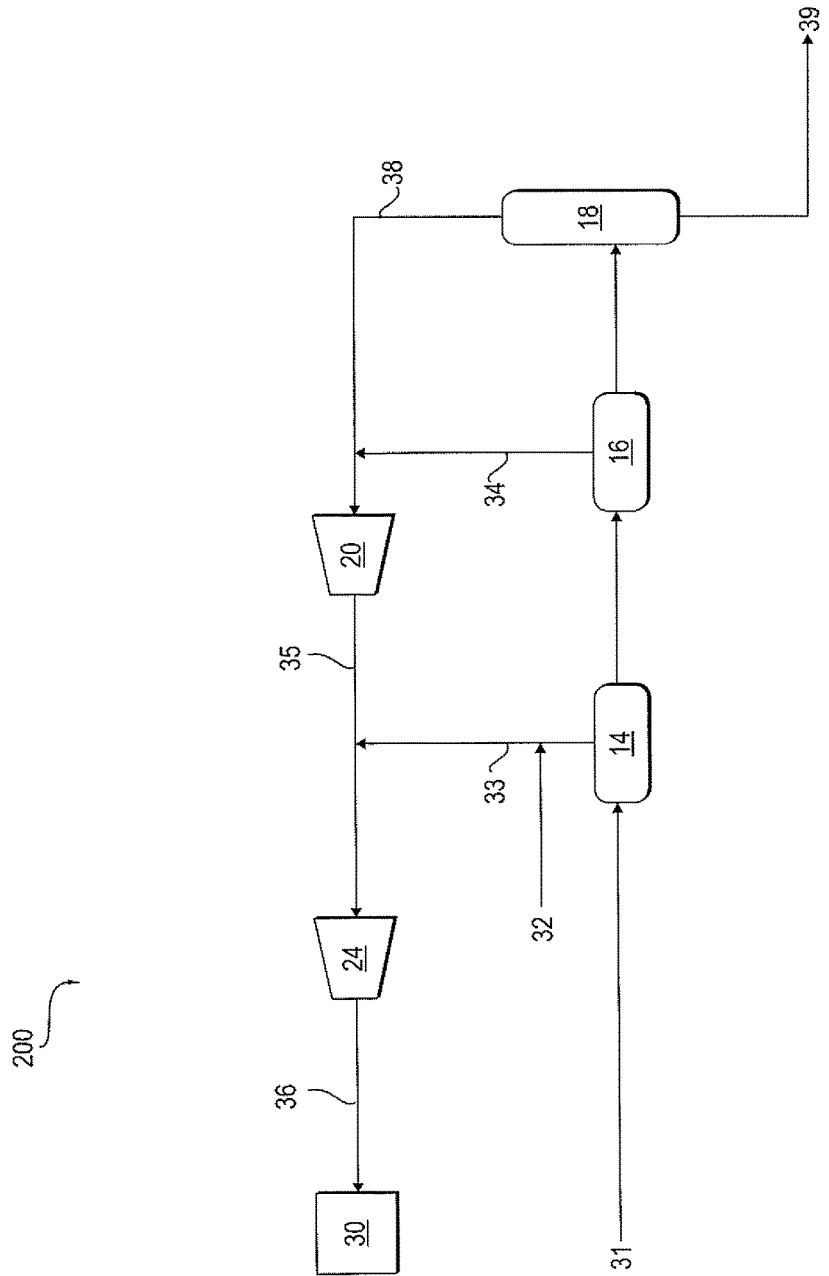
FIG. 2 shows a schematic diagram of a plant for gas processing in accordance with the prior art.

FIG. 2 is a schematic diagram of a sour gas injection plant 200 currently practiced in the art. As shown, oil stream 31 is flashed in a MP separator 14, followed by a LP separator 16 and crude stabilizer 18. LP flash gas 34 along with stabilizer overhead gas 38 is compressed in low pressure compressor 20 forming stream 35. Stream 35 is mixed with the MP flash gas 33 which is also mixed with associated gas 32 from the field and compressed in MP compressor 24 to a high-pressure stream 36 and eventually reinjected in sour gas injection unit 30. The sour gas injection unit 30 can include wet gas compression, dehydration and dry gas compression, so that a stream of gas containing hydrogen sulfide can be injected into a subterranean formation (not shown). The sour gas injection unit 30 compresses the sour gas, as an example, from 1000 psia to 10,000 psia depending on the pressure needed to inject the sour gas into the subterranean formation.

Figure 3:
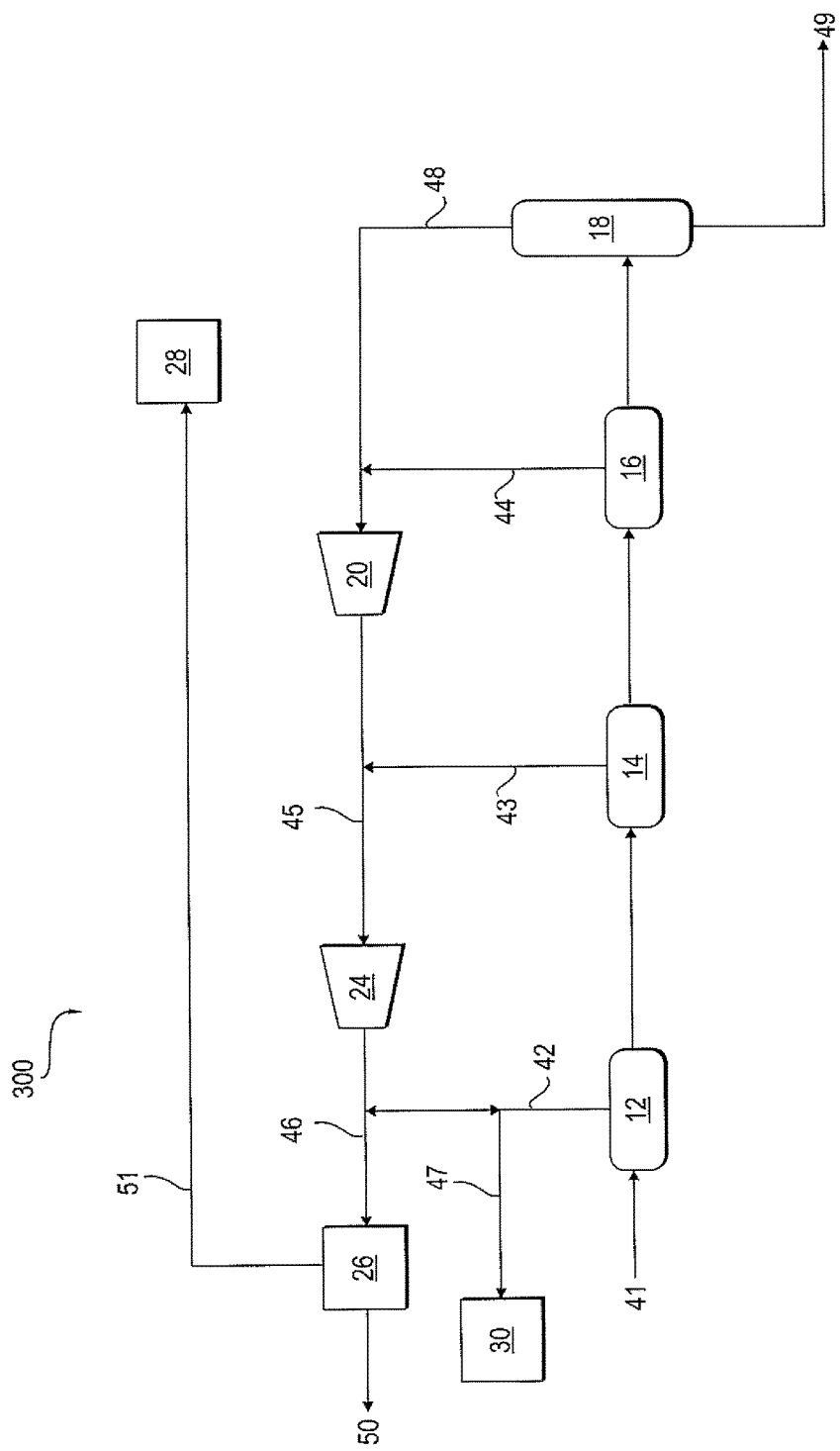
FIG. 3 shows a schematic diagram of a plant for gas processing in accordance with the prior art.

FIG. 3 is a schematic diagram of another gas processing plant 300 currently practiced in the art. In FIG. 3 the plant has a combination of both gas processing to remove hydrogen sulfide and sour gas injection. A single HP amine unit 26 and sour gas injection unit 30 with the same inlet pressure are present. All MP and LP gases (43 and 44 respectively) are combined with overhead gas 48 and recompressed in LP compressor 20 and MP compressor 24 to mix with the HP flash gas 42. None, some or all of the HP flash gas 42 can be combined with the outlet gas from compressor 24 to form stream 46 to be fed to HP amine unit 26 for processing, forming sweet gas stream 50 and acid gas stream 51 for further processing in SRU 28. Optionally, a portion of streams 42 and/or 46 may be diverted to gas stream 47 to sour gas injection unit 30.

The gas processing plants 100, 200 and 300 shown in FIGS. 1-3 respectively can be operated in parallel using a common feed of produced fluids and integrated such that gas and oil feed streams produced from a gathering station may flow to any plant in any amount.

In one embodiment, the gas processing plant 100 shown in FIG. 1 is debottlenecked. The use of hydrogen sulfide-selective membranes enables the debottlenecking of the MP amine unit 22 and/or the HP amine unit 26, thereby increasing oil production. In the embodiment of a plant 400 shown in FIG. 4, a hydrogen sulfide selective membrane 60 has been added to the gas processing plant 100 shown in FIG. 1 immediately upstream of the MP amine unit 22 such that the compressed stream 11 from the LP compressor 20 and the MP gas stream 3 are combined and fed to the inlet of the membrane 60. The membrane 60 removes a portion (e.g., 25 vol % to 50 vol %) of the inlet $H_2S$. A retentate or product stream 62 depleted in hydrogen sulfide is formed and fed to the MP amine unit 22. A permeate stream 63 enriched in hydrogen sulfide is formed and fed to permeate compressor 64 and recompressed back to the MP of 20 bar and sent to the inlet of the compressor 24 as shown in the plant 200 shown in FIG. 2. In cases in which additional gas is needed, a slipstream of stream 32, i.e., 32A, from the gas processing plants 200 in FIG. 2 may be added to stream 11 of gas processing plant 400 shown in FIG. 4. Compressed permeate stream 65 can be sent to be combined with the MP gas 35 of FIG. 2. Diverting more associated sour gas from plant 200 to the debottlenecked plant 400 accomplishes two things. First, it enables plant 400 to fully utilize the capacity of amine plants 22 and 26 when membrane 60 is added. Secondly, it frees up some capacity in compressor 24 of plant 200 in order to accommodate the compressed permeate stream 65 from plant 400. Additionally, or alternatively, compressed permeate stream 65 can be sent to be combined with the MP gas 43 of plant 300 and diverted to sour gas injection unit 30.

Figure 4:
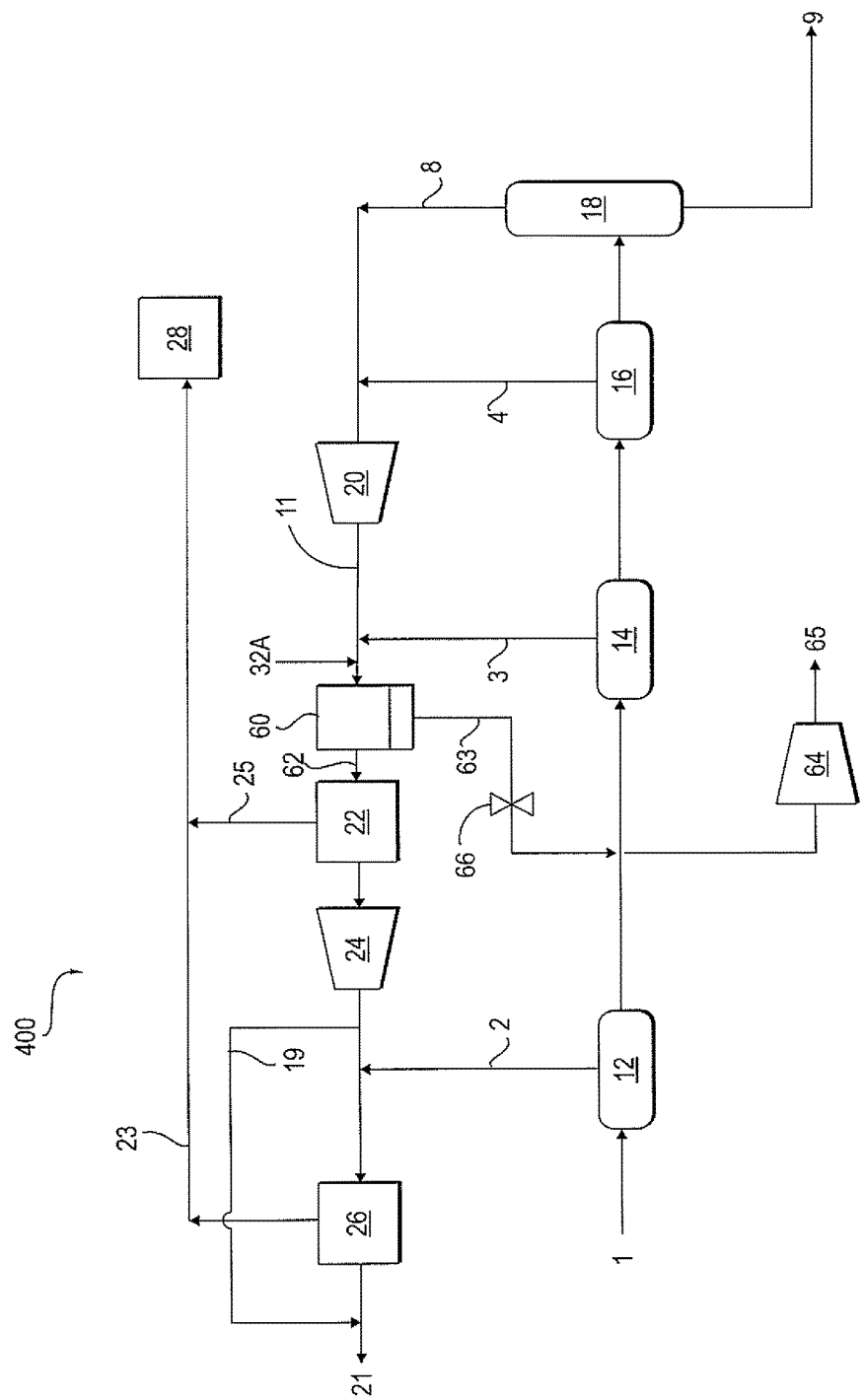
FIG. 4 shows a schematic diagram of a plant for gas processing in accordance with certain example embodiments.

By the addition of the membrane 60 as shown in FIG. 4, the amine units 22 and 26 in plant 100 can be debottlenecked. The gas-oil feed stream 1 to plant 400 may be increased until the amine units 22 and 26 are fully utilized and the compressor 24 of plant 300 capacity limit is not exceeded after membrane 60 is added. Alternatively, associated sour gas from plant 200 (slipstream of stream 32, i.e., 32A) may be added as described above upstream of membrane 60. In this process, the plant 200 shown in FIG. 2 has a slightly-higher % $H_2S$ sour gas to inject in the subsurface formation while the plant 400 shown in FIG. 4 has a much lower % $H_2S$ sour gas to process; whereby this scheme enables more production of sweet gas 21 and oil 9 as compared to the plant 100 shown in FIG. 1.

Figure 5:
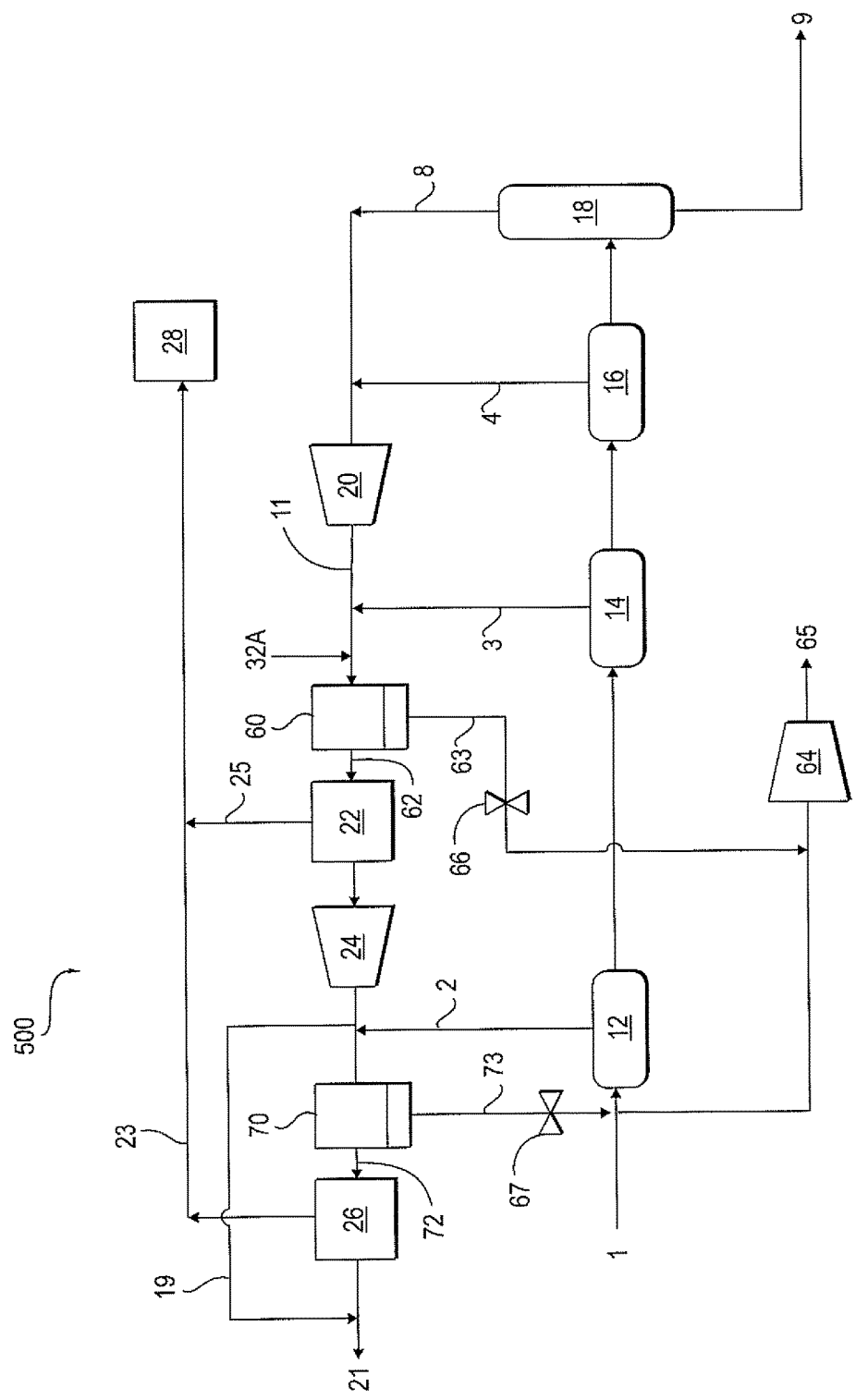
FIG. 5 shows a schematic diagram of a plant for gas processing in accordance with certain example embodiments.

In the embodiment of a plant 500 shown in FIG. 5, $H_2S$-selective membranes may be placed upstream of both the HP amine unit 26 and the MP amine unit 22 of plant 100 (shown in FIG. 1). To maximize utilization of the existing amine units 22 and 26 and SRU 28, the total flowrate of the gas-oil stream 1 (at a fixed GOR) to plant 500 is increased or the GOR of the gas-oil stream 1 is increased (at a fixed total flowrate). Alternately, a portion of associated gas 32 from plant 200 (FIG. 2) may be added to the inlet of membrane 60 in plant 500. This would free up capacity in compressor 24 of plant 200 to accommodate permeate streams (streams 73 and 63 from the HP and MP membrane units 70 and 60, respectively) from the membranes in plant 500 thereby debottlenecking the amine plants 22 and 26 in plant 500, and allowing incremental MP gas 32A from plant 200 to be processed by the plant 500. The $H_2S$-rich permeate streams 73 and 63 from the HP and MP membrane units 70 and 60 are compressed in Compressor 64 to stream 65, which can be added to stream 35 (Compressor 24 inlet) to the plant 200 shown in FIG. 2 where they are eventually injected into the subterranean formation (not shown).

In this and all embodiments, the $H_2S$-selective membrane 60 and 70 may be any polymeric membrane known for use in membrane separations, including but not limited to membranes made with cellulose acetate, cellulose triacetate, polyimide, or rubbery polymers such as polyether block amide (PEBA, e.g., Pebax® available from Arkema Inc., King of Prussia, Pa.) and polyurethanes that preferentially permeate $H_2S$ over hydrocarbons such as methane, ethane, propane and butane. Preferably the membranes have a mixed-gas $H_2S/CH_4$ selectivity of 10 or greater when measured at 35° C. and 300 psig feed. By "mixed-gas $H_2S/CH_4$ selectivity" is meant the ratio of permeances of $H_2S$ to methane in a multicomponent gas stream. In another embodiment, the mixed-gas $H_2S/CH_4$ selectivity is at least 20. In yet another embodiment, the mixed-gas $H_2S/CH_4$ selectivity is at least 40. Also, ideally, the $H_2S$ permeance is 0.4-times or greater than the $CO_2$ permeance when measured at 35° C. and 300 psig feed. In another embodiment, the $H_2S$ permeance is greater than 0.6 times the $CO_2$ permeance. And in yet another embodiment, the $H_2S$ permeance is greater than 0.9 times the $CO_2$ permeance. With respect to the form of the membrane, by way of example and not limitation, the form of the membrane may be a hollow fiber or flat film configured in hollow fiber membrane module, spiral wound module or plate-and-frame module. Those skilled in the art of membrane separation of gases will appreciate that other configuration of membranes may be used to separate gases.

Table 1 shows some exemplary data of a lab-scale membrane exhibiting preferential selectivity of $H_2S$ and $CO_2$ over methane. This membrane is similar to those disclosed in US Pat. Publication No. 2010/0186586A1, and U.S. Pat. Nos. 6,932,859B2, and 7,247,191B2.

TABLE 1

Gas Separation Using 6fda:Dam:Daba (3:2) Crosslinked Membrane

| FEED | Temp (deg C.) | Feed (psig) | Permeance CH4 (GPU) | Permeance CO2 (GPU) | Permeance H2S (GPU) |
|---|---|---|---|---|---|
| Pure Gas CH4 and Pure Gas CO2 | 35 | 300 | 1.2 | 55 | N/A |
| 4.1% H2S, 21% CO2, 74.9% CH4 | 38 | 905 | 0.55 | 13 | 5.6 |
| 20.5% H2S, 3.9% CO2, 75.6% CH4 | 38 | 300 | 0.85 | 22 | 13 |
|  | 38 | 605 | 0.71 | 17 | 10 |
|  | 54 | 300 | 0.98 | 22 | 12 |
|  | 54 | 575 | 0.87 | 18 | 10 |

Modules have 3 fibers, 260 micron OD, 12.5 cm L (effective area = 3.06 cm2). Shell-side feed, Permeate pressure = 0 psig, Stage Cut < 1.2%, Feed Flow: 244-256 scc/min Advantageously, using the embodiments described above, the plant 200 shown in FIG. 2 can inject sour gas having a somewhat higher % $H_2S$ while the plant 100 shown in FIG. 1 can process sour gas having a somewhat lower % $H_2S$. In both cases, the addition of the membranes 60 and/or 70 enables the advantages.

In one embodiment, the bottlenecked plant 100 shown in FIG. 1 can be retrofit to obtain the debottlenecked plant 400 shown in FIG. 4. In order to accomplish the retrofit, line 11 is disconnected upstream of the MP amine 22 and downstream of the introduction of gas stream 3 into line 11, and reconnected to the inlet of the membrane 60. The retentate outlet of the membrane 60 is connected to the inlet of the MP amine 22. The permeate compressor 64 is connected to the permeate outlet of the membrane 60. A valve 66 is installed between the membrane 60 and the new permeate compressor 64 for controlling the permeate pressure.

In one embodiment, the bottlenecked plant 100 shown in FIG. 1 can be retrofit to obtain the debottlenecked plant 500 shown in FIG. 5. In order to accomplish the retrofit, line 11 is disconnected upstream of the MP amine 22 and downstream of the introduction of gas stream 3 into line 11, and reconnected to the inlet of the membrane 60. The retentate outlet of the membrane 60 is connected to the inlet of the MP amine 22. The permeate compressor 64 is connected to the permeate outlet of the membrane 60. A valve 66 is installed between the membrane 60 and the new permeate compressor 64 for controlling the permeate pressure. Line 17 is disconnected upstream of the HP amine 26 and downstream of the introduction of gas stream 2 into line 17, and reconnected to the inlet of the membrane 70. The retentate outlet of the membrane 70 is connected to the inlet of the HP amine 26. The permeate outlet of the membrane 70 is connected to the permeate compressor 64. A valve 67 is installed between the membrane 70 and the permeate compressor 64 for controlling the permeate pressure.

It should be noted that only the components relevant to the disclosure are shown in the figures, and that many other components normally part of a gas processing, an oil processing and/or a gas injection system are not shown for simplicity. From the above description, those skilled in the art will perceive improvements, changes and modifications, which are intended to be covered by the appended claims.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for increasing oil production in an integrated oil and gas production plant including hydrogen sulfide removal and sour-gas injection, comprising:
   a. a series of a first, second and third oil-gas separators in sequence for separating an oil-gas mixture into oil and gas phases at decreasing pressures;
   b. a crude stabilizer for receiving an oil phase from the third oil-gas separator and forming a stabilized crude and an overhead gas stream;
   c. a low-pressure compressor for compressing the overhead gas stream combined with the gas phase from the third oil-gas separator to form a medium pressure stream;
   d. a first hydrogen sulfide-selective membrane to remove hydrogen sulfide from the medium pressure stream combined with the gas phase from the second oil-gas separator to form a first permeate stream enriched in hydrogen sulfide and a first retentate stream depleted in hydrogen sulfide and enriched in hydrocarbon gases;
   e. a medium-pressure amine unit for removing hydrogen sulfide from the first retentate stream to form a medium pressure stream depleted in $H_2S$ and a low-pressure acid-gas stream enriched in $H_2S$;
   f. a medium-pressure compressor for compressing the medium pressure stream depleted in $H_2S$ to form a high-pressure stream;
   g. a high-pressure amine unit for removing hydrogen sulfide from the high-pressure stream combined with the gas phase from the first oil-gas separator to form a sweet gas stream depleted in $H_2S$ and a low-pressure acid stream enriched in $H_2S$;
   h. a Claus unit for generating sulfur from the acid-gas streams enriched in $H_2S$ that are generated from the medium-pressure and high-pressure amine plants;
   i. a permeate compressor for compressing the first permeate stream to form a compressed first permeate stream, and
   j. piping for delivering the compressed first permeate stream to a plant comprising a sour gas injection unit for injecting the compressed first permeate stream into a subterranean formation.

2. A system for increasing oil production in an integrated oil and gas production plant including hydrogen sulfide removal and sour-gas injection, comprising:
   a. a series of a first, second and third oil-gas separators in sequence for separating an oil-gas mixture into oil and gas phases at decreasing pressures;
   b. a crude stabilizer for receiving an oil phase from the third oil-gas separator and forming a stabilized crude and an overhead gas stream;
   c. a low-pressure compressor for compressing the overhead gas stream combined with the gas phase from the third oil-gas separator to form a medium pressure stream;
   d. a first hydrogen sulfide-selective membrane to remove hydrogen sulfide from the medium-pressure stream combined with the gas phase from the second oil-gas separator to form a first permeate stream enriched in hydrogen sulfide and a first retentate stream depleted in hydrogen sulfide and enriched in hydrocarbon gases;
   e. a medium-pressure amine unit for removing hydrogen sulfide from the first retentate stream to form a medium-pressure stream depleted in $H_2S$ and a low-pressure acid-gas stream enriched in $H_2S$;
   f. a medium-pressure compressor for compressing the medium-pressure stream depleted in $H_2S$ to form a high-pressure stream;
   g. a second hydrogen sulfide-selective membrane to remove hydrogen sulfide from the high-pressure stream combined with the gas phase from the first oil-gas separator to form a second permeate stream enriched in hydrogen sulfide and a second retentate stream depleted in hydrogen sulfide and enriched in hydrocarbon gases;
   h. a high-pressure amine unit for removing hydrogen sulfide from the second retentate stream to form a sweet gas stream and an acid-gas stream;
   i. a Claus unit for generating sulfur from the low-pressure, acid-gas stream enriched in $H_2S$ generated from the medium- and high-pressure amine units;
   j. a permeate compressor for compressing the first permeate stream and the second permeate stream to form a compressed injection stream; and
   k. piping for delivering the compressed injection stream to a plant comprising a sour gas injection unit for injecting the compressed injection stream into a subterranean formation.

3. A method for increasing oil production in an integrated oil and gas production plant including hydrogen sulfide removal and sour-gas injection, comprising:
   a. separating an oil-gas mixture into oil and gas phases in a series of a first, second and third oil-gas separators in sequence at decreasing pressures;
   b. receiving an oil phase from the third oil-gas separator and forming a stabilized crude and an overhead gas stream in a crude stabilizer;
   c. compressing the overhead gas stream combined with the gas phase from the third oil-gas separator to form a medium-pressure stream in a low-pressure compressor;
   d. removing hydrogen sulfide from the medium-pressure stream combined with the gas phase from the second oil-gas separator in a hydrogen sulfide-selective membrane to form a permeate stream enriched in hydrogen sulfide and a retentate stream depleted in hydrogen sulfide and enriched in hydrocarbon gases;
   e. removing hydrogen sulfide from the retentate stream in a medium-pressure amine unit to form a medium-pressure stream depleted in $H_2S$ and a low-pressure acid-gas stream enriched in $H_2S$;
   f. compressing the medium-pressure stream depleted in $H_2S$ in a medium-pressure compressor to form a high-pressure stream;
   g. removing hydrogen sulfide from the high-pressure stream combined with the gas phase from the first oil-gas separator in a high-pressure amine unit to form a sweet gas stream and a low-pressure stream enriched in $H_2S$;
   h. processing the low-pressure acid gas streams enriched in $H_2S$ from the medium-pressure and high-pressure amine units and producing elemental sulfur in a Claus unit;
   i. compressing the permeate stream in a permeate compressor to form a compressed permeate stream; and
   j. delivering the compressed permeate stream to a plant comprising a sour gas injection unit for injecting a sour gas stream into a subterranean formation.

4. A method for increasing oil production in an integrated oil and gas production plant including hydrogen sulfide removal and sour-gas injection, comprising:
   a. separating an oil-gas mixture into oil and gas phases in a series of a first, second and third oil-gas separators in sequence at decreasing pressures,
   b. receiving an oil phase from the third oil-gas separator and forming a stabilized crude and an overhead gas stream in a crude stabilizer;
   c. compressing the overhead gas stream combined with the gas phase from the third oil-gas separator to form a medium-pressure stream in a low-pressure compressor;
   d. removing hydrogen sulfide from the medium-pressure stream combined with the gas phase from the second oil-gas separator in a first hydrogen sulfide-selective membrane to form a first permeate stream enriched in hydrogen sulfide and a first retentate stream depleted in hydrogen sulfide and enriched in hydrocarbon gases;
   e. removing hydrogen sulfide from the first retentate stream in a medium-pressure amine unit to form a medium-pressure stream depleted in $H_2S$ and a low-pressure acid-gas stream enriched in $H_2S$;
   f. compressing the medium-pressure stream depleted in $H_2S$ in a medium-pressure compressor to form a high-pressure stream;
   g. removing hydrogen sulfide from the high-pressure stream combined with the gas phase from the first oil-gas separator in a second hydrogen sulfide-selective membrane to form a second permeate stream enriched in hydrogen sulfide and a second retentate stream depleted in hydrogen sulfide and enriched in hydrocarbon gases;
   h. removing hydrogen sulfide from the from the second retentate stream in a high-pressure amine unit to form a sweet gas stream and an acid-gas stream;
   i. processing the acid-gas streams enriched in $H_2S$ from the medium-pressure and high-pressure amine units in a Claus unit and producing elemental sulfur;
   j. compressing the first permeate stream and the second permeate stream to form a compressed injection stream; and
   k. injecting the compressed injection stream into a subterranean formation.

5. A method of retrofitting an integrated oil and gas production plant comprising a gas processing plant for processing a first associated gas stream containing 1-50% hydrogen sulfide by volume, a sour gas injection plant for injecting a first sour gas stream into a subterranean formation and a hybrid plant for processing a second associated gas stream containing 1-50% hydrogen sulfide by volume and injecting a second sour gas stream into the subterranean formation, comprising:

adding a first hydrogen sulfide-selective membrane upstream of a first amine unit to remove hydrogen sulfide from the first associated gas stream and form a first permeate stream enriched in hydrogen sulfide and a first retentate stream depleted in hydrogen sulfide and enriched in hydrocarbon gases;

such that less hydrogen sulfide is sent to the first amine unit than in the integrated oil and gas production plant without the hydrogen sulfide-selective membrane and the integrated oil and gas production plant has an increased oil production rate as compared with the integrated oil and gas production plant without the hydrogen sulfide-selective membrane.

6. The method of claim 5 wherein the integrated oil and gas production plant has an increased gas production rate as compared with the integrated oil and gas production plant without the hydrogen sulfide-selective membrane.

7. The method of claim 5 wherein the integrated oil and gas production plant has an increased increase feed rate as compared with the integrated oil and gas production plant without the hydrogen sulfide-selective membrane.

8. The method of claim 5 wherein the integrated oil and gas production plant has an increased sour gas injection rate as compared with the integrated oil and gas production plant without the hydrogen sulfide-selective membrane.

9. The method of claim 5 further comprising adding a second hydrogen sulfide-selective membrane upstream of a second amine unit downstream of the first amine unit to remove further hydrogen sulfide from the first associated gas stream.

* * * * *